United States Patent

Fadden, Jr.

[15] 3,685,291

[45] Aug. 22, 1972

[54] POLLUTION FREE ELECTRIC POWER AND WATER PRODUCING STATION UTILIZING THE KINETIC AND POTENTIAL ENERGY OF WATER WIND WAVES

[72] Inventor: William J. Fadden, Jr., 1005 W. 96th St., Kansas City, Mo. 64114

[22] Filed: Oct. 1, 1970

[21] Appl. No.: 77,279

[52] U.S. Cl. ............................60/57 T, 60/8, 60/62, 417/100
[51] Int. Cl. ..............................................E02b 9/08
[58] Field of Search ..........417/100, 65, 330; 185/33; 60/7 R, 8, 9, 20, 55, 55.7 R, 57 T, 62

[56] References Cited

UNITED STATES PATENTS

| | | | |
|---|---|---|---|
| 610,790 | 9/1898 | Beckers | 60/57 X |
| 1,366,002 | 1/1921 | Hutchinson | 417/100 |
| 1,791,239 | 2/1931 | Braselton | 417/100 |
| 2,097,723 | 11/1937 | Ewing et al. | 60/62 UX |
| 3,149,776 | 9/1964 | Parrish | 417/100 |
| 3,379,008 | 4/1968 | Manganaro | 60/57 |

Primary Examiner—Edgar W. Geoghegan
Attorney—Keith Misegades and George R. Douglas, Jr.

[57] ABSTRACT

An electric power station producing fresh water as a by-product by a dehumidification process, utilizing the kinetic and potential energy of water wind waves common to large bodies of water, comprising a wave energy converter including a reception channel and an automatically adjustable standing wave basin, which augments the inherent potential energy of the waves by converting extant kinetic energy therein into potential energy, a wave energy extraction system comprising a plurality of vertical chambers having open bottom ends located approximately coincident with the theoretical wave nodal line and having upper ends, check valved to admit ambient air as the water level therein descends, and to allow to be discharged therefrom as the water level therein rises, an intake manifold admitting ambient air to the chambers, an exhaust manifold for collecting exhausted air under pressure, a refrigerant coil system for extracting water from the exhausted air, and a power conversion system for utilizing the exhausted air under pressure as the prime mover to create electrical energy. The process occurs at or near ambient temperature, thereby minimizing entropy increase loss in the entire system.

11 Claims, 10 Drawing Figures

INVENTOR
WILLIAM J. FADDEN, Jr.

BY *Keith Misegades*
ATTORNEY

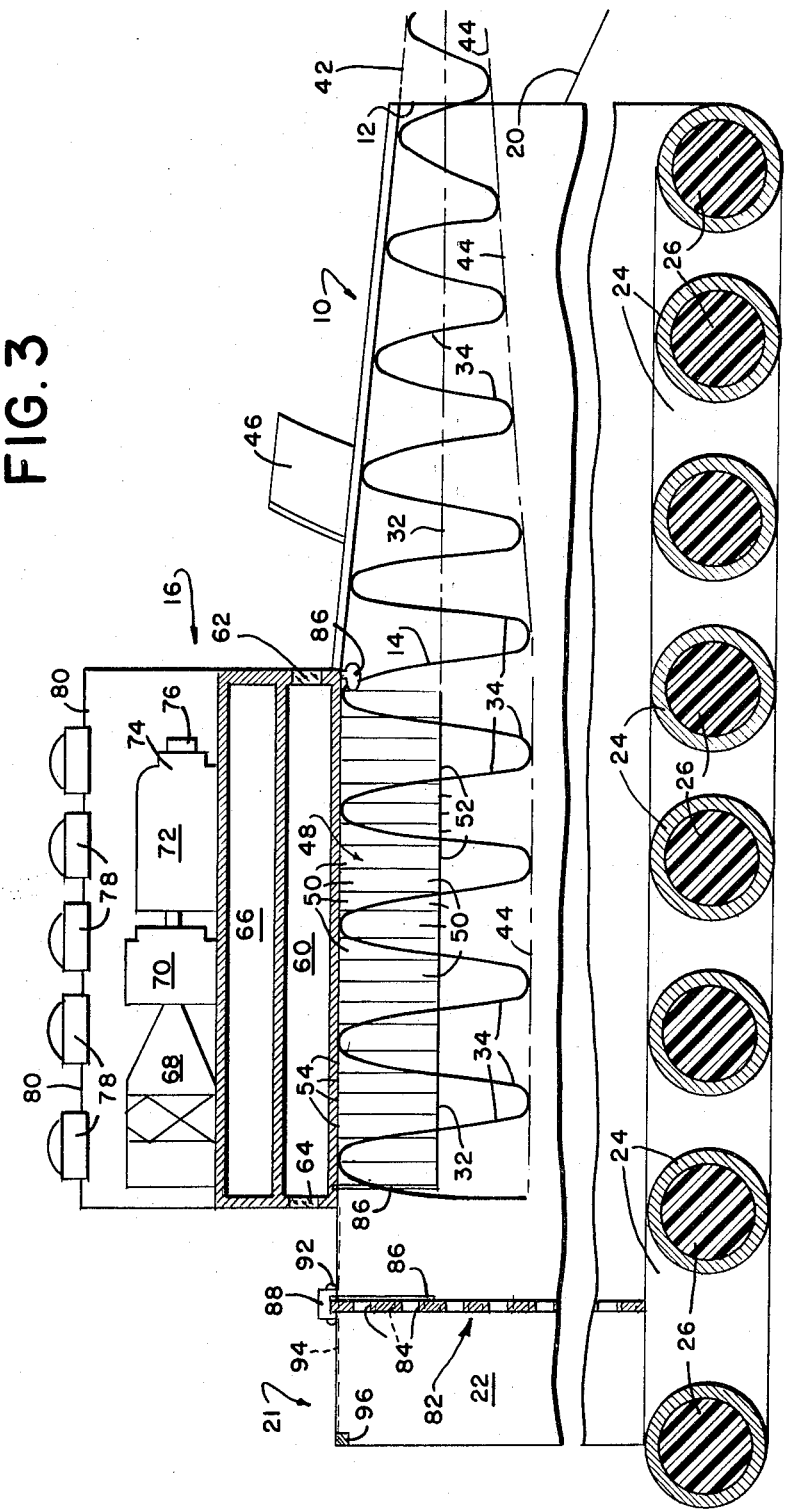

INVENTOR.
WILLIAM J. FADDEN, Jr.

ATTORNEY

INVENTOR
WILLIAM J. FADDEN, Jr.
BY *Keith Misegades*
ATTORNEY

POLLUTION FREE ELECTRIC POWER AND WATER PRODUCING STATION UTILIZING THE KINETIC AND POTENTIAL ENERGY OF WATER WIND WAVES

BACKGROUND OF THE INVENTION

The invention relates primarily to a feasible wave energy extraction power plant and suitable apparatus and methodology for utilizing the ample amounts of energy available in the world's seas, lakes and other large bodies of water, without need of contaminating and polluting the biosphere environment as has been and is being done with all extant power producing systems, be they of the fossil fuel or nuclear energy variety. One important byproduct of the instant invention is pure, useful water, rather than contaminants and other objectionable waste matter as is presently true.

The pollution-free aspect of this invention is due to the fact that non-delayed solar inspiration is utilized as the energy source, the motive force behind the wave action.

The prior art is not devoid of pioneering, but rather crude and ineffectual attempts to harness the potential energy of the earth's oceans. U.S. Pat. No. 1,868,087 issued to Robert S. Blair shows an entranceway for water to enter under influence of the tides and waves through check valves into a standpipe, whereafter stored water is fed through a prime mover by gravity feed. Thus kinetic energy is transformed into potential energy, but corrosive sea water must flow through the entire system and no provision is made for fresh water extraction. The flotation principle of wave energy extraction is indicated in U.S. Pat. No. 2,179,537, issued to Arthur E. Zoppa; U.S. Pat. No. 2,668,918 issued to Vernon H. Howell; and U.S. Pat. No. 2,871,790 issued to Raymond T. Weills. The basic deficiency of these proposals is the requirement of complex mechanical linkage needed to utilize the energy extracted from waves and tides by a vertically movable float. The friction losses alone make the suggestion impractical.

A different tack is expressed in U.S. Pat. No. 2,886,951, issued to Jean Valembois, which discloses simple hydraulic resonators, primarily employed to assist a breakwater in protecting harbors from the forces of wave action. A multiplier effect of wave energy caused by wave swells oscillating in a vertical chamber is recognized, but utilization of this energy, for purposes other than a breakwater or a water elevator, are not discussed.

Two U.S. patents are relevant in that they discuss the general principle of employing wave and tide energy to compress air as a source of useful power, the latter patent further including a disclosure of distilling water from the resultant, compressed air. These are U.S. Pat. No. 3,047,207 issued to Winton R. Baldin, and U.S. Pat. No. 3,149,776 issued to William C. Parrish. The former patent is somewhat suspect in that the flotation principle of energy utilization is used, presenting the aforementioned difficulty of moving parts. The float is mechanically connected to piston rods and pistons, within air compressor cylinders which alternately draw ambient air in and compress the same with falling and rising water respectively. The latter patent is more relevant, showing an air chamber resting on a float support structure, with a check valve arrangement at the rear to bleed off air compressed by waves entering the primary air chamber. However, raw kinetic energy of the wave only is used, and a great deal of energy will be wasted due to friction drop caused by the onrushing wave.

In other words, the prior art suggestions of wave energy utilization all include the major deficiency of not utilizing the inherent kinetic and potential energy of waves to maximum effect. In contradistinction, the present invention is designed to extract the maximum energy available in wind created waves by, first, creating a standing wave having almost all potential energy and nearly no kinetic energy, from a wave initially having both kinetic and potential energy, and secondly, by operating at or near ambient temperature thereby holding entropy increase loss to a minimum.

SUMMARY OF THE INVENTION

The instant invention overcomes the inherent disadvantages of the prior art discussed above by providing an air compressor wave motor unit comprising two distinct but cooperating parts: first, a straight sided or exponentially curved channel for increasing wave amplitude by converting potential energy, and, second, a plurality of vertically disposed chambers, arranged in honeycomb fashion with open ends disposed coincident with a theoretical wave nodal line so that wave trains passing therebeneath will enter and compress ambient air therein. Intake and discharge manifolds are operatively located on the upper ends of the chambers to collect compressed air and provide new charges of ambient air to the chambers.

An automatically adjustable standing wave basin including a movable wall is located rearwardly of the vertical chambers. The movable wall is positioned in response to one probe located immediately rearwardly of the vertical chambers and a second probe on the movable wall, which sense the level of water passing thereby and control movement of the movable wall so that it is positioned to create standing waves in the vertical chambers and to minimize energy deterioration due to reflection and infringement. The unit is supported by a buoyant structure, the top of which is located at about twice the design wave height beneath the surface, for stability, including anchors and vertical stabilizers to retain the wave channel with its reception mouth directed to the oncoming waves. The energy extraction portion of the invention includes a dehumidification or water condensing system followed by an air operated turbine to which an electrical generator is secured.

BRIEF DESCRIPTION OF THE DRAWINGS

Details of construction and operation according to preferred embodiments of the invention will become readily apparent by reference to the following drawings wherein:

FIG. 3 is a sectional view taken along lines 3—3 of FIG. 2, and drawn to an enlarged scale;

DESCRIPTION OF THE PREFERRED EMBODIMENTS

Figure 2:
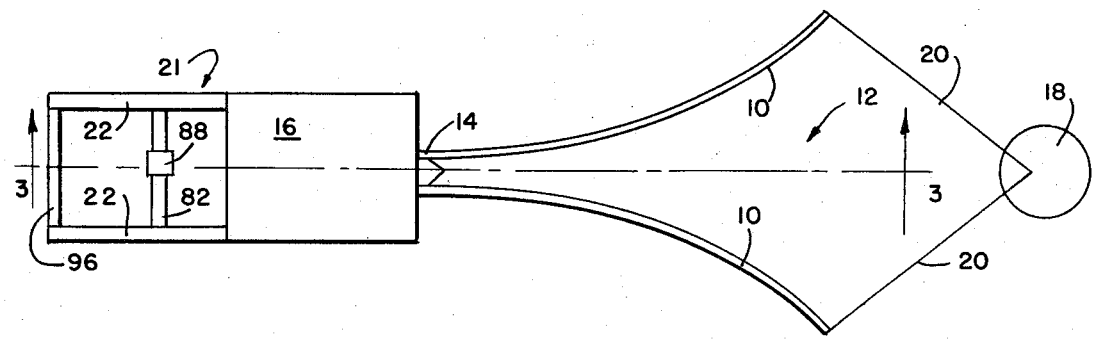
FIG. 2 is a top plan view showing one embodiment of the overall invention.

Referring now to the drawings by reference character, the basic power system envisaged by the instant invention comprises an energy converter in the form of a wave reception channel 10 having an entry mouth 12 and a discharge end 14, and a power unit 16 for extracting energy from the waves. The invention is disposed in a large body of water, be it lake, bay or, more likely, ocean, with mouth 12 facing the direction of the wind for maximum utilization of extant wind wave energy. This is accomplished by a sea anchor 18 with lines 20, 20 secured to channel 10, walls 28 and 30, and standing wave basin 21 having stabilization plates or walls 22, 22. In essence then the invention moves much as a weather vane does in air, about a reference point which is sea anchor 18. Walls 22, 22 also act as a buffer preventing extraneous waves from entering the operative portion of the invention from the sides and rear.

In FIG. 3, a buoyant support structure for the invention is indicated by numeral 24, which preferably would comprise reinforced concrete having foam filled tubes or buoys 26 to positively buoy the invention in water. Any cross-bracing, if necessary, is not shown. The specific details of construction and design, including materials employed, are not an essential part of the instant invention, other than the support 24 ought to be engineered to buoy the invention so that the open, bottom ends of multiple vertical chambers air compressor unit, which will be covered in detail below, are coincident with a predetermined theoretical wave nodal line, indicated at 32.

Figure 4:
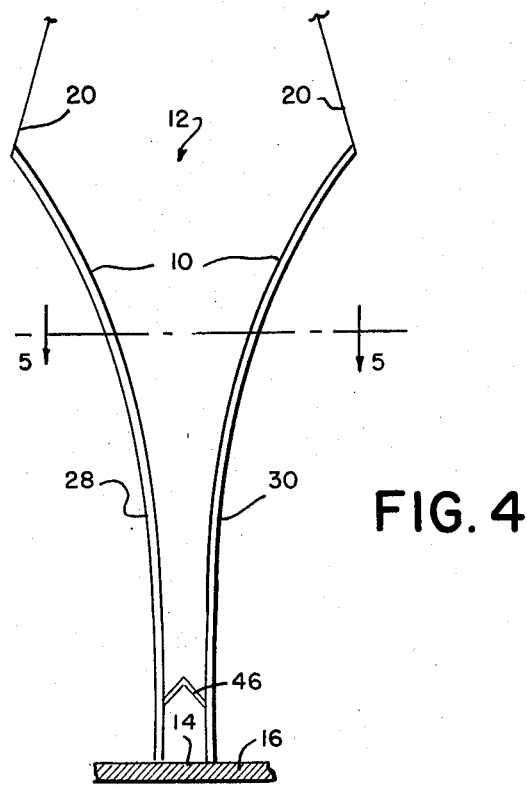
FIG. 4 is a partial, top plan view of the wave reception channel, shown in the right hand portion of FIG. 2, and drawn to an enlarged scale.
Figure 5:
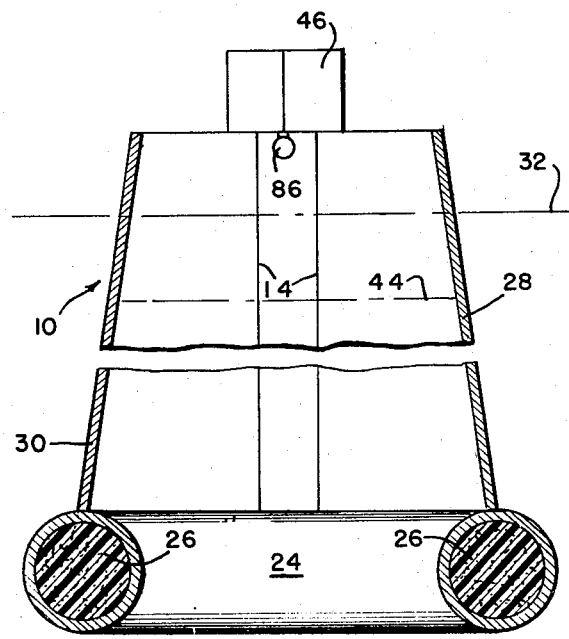
FIG. 5 is a partial sectional view taken along line 5—5 of FIG. 4.
Figure 7:
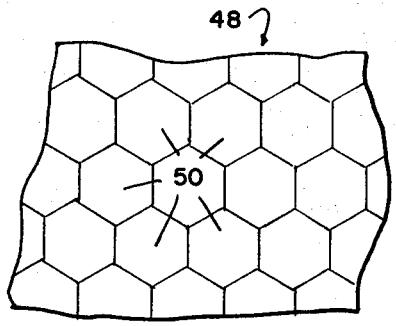
FIG. 7 is a sectional view taken along lines 7—7 of FIG. 6.
Figure 6:
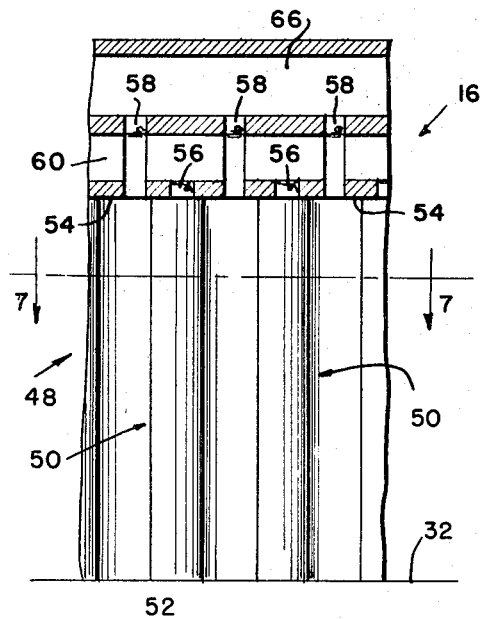
FIG. 6 is a partial, sectional view, showing some of the vertical chambers, taken generally from the center left portion of FIG. 3, and drawn to an enlarged scale.
Figure 8:
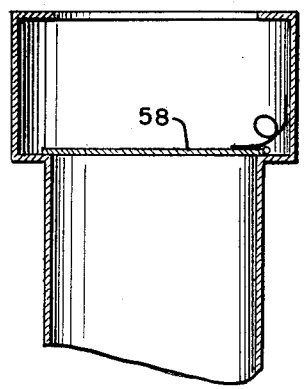
FIG. 8 is a detail view taken from the upper center portion of FIG. 7, and shows a single discharge check valve communicating a vertical chamber to the discharge manifold.
Figure 9:
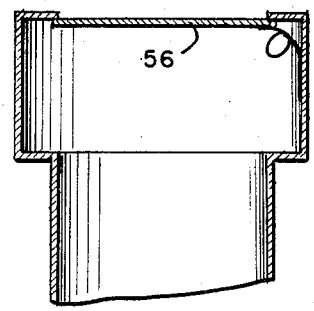
FIG. 9 is similar but shows an intake check valve communicating the intake manifold to a single vertical chamber.

The essential operative portions of the invention will be discussed sequentially as waves enter and leave the structure, or from the right hand side to the left, with reference to FIGS. 2 and 3. The invention is designed to utilize the energy of wind created waves; such is the reason for the anchor and stabilizing plate system to retain the invention oriented in the direction of the wind. Wind wave energy is both kinetic and potential. The kinetic energy of waves is the circular motion of water particles while potential energy is represented by the position of given water particles at any given point with respect to a predetermined datum line. The point of the instant invention is to convert extant kinetic energy into potential energy, thereby augmenting the extant potential energy, and then using this converted energy. Since the equation for kinetic energy is $\frac{1}{2}mv^2$, where $m$ stands for mass and $v$ for velocity, and since energy can neither be created nor destroyed, then as $v$ approaches zero, kinetic energy is converted into potential energy. For this to take place, it is necessary to reduce water velocity in the wave to near zero. For any given wave, water velocity includes both circular water particle movement as well as overall flow in the direction of the wind. Conversion is accomplished by reception channel 10 which so converts the wave with the result that initial wave height is nearly doubled as illustrated by wave train line 34 (FIG. 3). In the preferred embodiment, the walls 28, 30 of wave reception channel 10 are shown exponentially curved from entry 12 to exit 14 (FIG. 4), and sloping from bottom to top, towards each other (FIG. 5). Alternatively, these walls might be straight sided instead of exponentially curved, and vertically disposed instead of sloping (not shown). In any event, the effect of the converging side walls of channel 10 is to markedly increase wave amplitude as wave kinetic energy (circular water particle motion) is converted to potential (position of water particles above or below a given datum line) and added to extant potential energy. Specific design of channel 10 is made easier by reference to *The Propogation of Tidal Waves into Channels of Gradually Varying Cross Section*, Technical Memorandum No. 112, Beach Erosion Board, U.S. Army Corps of Engineers, May 1959. Both straight-sided and exponentially curved side walled channels are considered in this memorandum, at pages 9 et seq. and 16 et seq., respectively.

Figure 1:
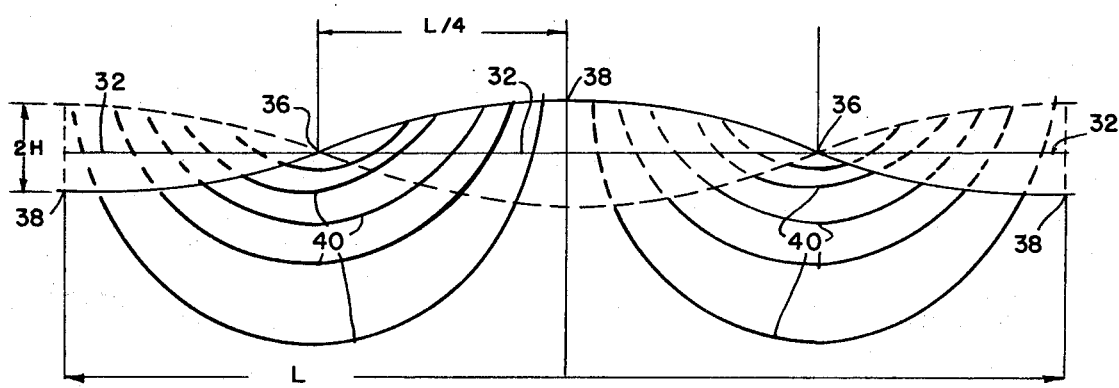
FIG. 1 is a water particle diagrammatic sketch showing particle motion in a wave converted from mixed kinetic and potential energy.

A cross section view of a resultant converted wave is diagrammatically illustrated by FIG. 1. L indicates wave length and H, wave height. Wave nodes are shown at point 36, 36; antinodes are illustrated at points 38, 38 and 38. The nodal line 32, drawn through nodes 36, 36 represents, of course, the desired datum line for determining the vertical orientation of the entire structure. Once kinetic energy is converted, water particle motion below the nodal line will be radially outward from the nodes 38 as represented by lines 40, instead of circular.

Engineering design of channel 10 will also have to take into consideration the average wave train characteristics of the specific area where the invention will be located. Considerable work in this area has already been done by the U. S. Army Corps of Engineers by the method of hindcasting, or, in simple terms, predicting wave behavior patterns for any specific locale by analyzing observed wave date for that area over a considerable period of time. Hindcasts have been prepared by the Beach Erosion Board, U.S. Army Corps of Engineers, for the Atlantic, Pacific and Gulf Coasts of the United States mainland and for the Great Lakes coastal areas. For example, *North Atlantic Coast Wave Statistics Hindcast by the Bretschneider-Revised Sverdrup-Munk Method, Technical Memorandum* 55, Beach Erosion Board, U.S. Army Corps of Engineers, November, 1954, analyzes wave statistics at four locations (Penobscot Bay, Maine; Nauset Beach Cape Cod, Mass., New York Harbor entrance; and Chesapeake Bay entrance) and gives results in the form of synchronous wave trains to assist engineers in the design of coastal structures and installations. Wave data was computed by the significant wave concept and found to be exceedingly accurate by multiplying the results by the constant 0.58 to find true energy. In other words, since wave trains are by nature exceedingly irregular, only the significant waves were plotted.

At any rate, the wave train line 34 (FIG. 3), although oversimplified, is usefully accurate and clearly shows the change in wave amplitude as waves travel through channel 10. Lines 42 and 44 indicate the significant wave crest and trough lines, respectively. Occasional waves that are of an amplitude exceeding the significant or design wave amplitude are dissipated by means of a wave splitter 46 (FIGS. 3 and 4). Of course, smaller waves are absorbed in the converting channel 10.

The essential, wave energy extraction section of the invention is best illustrated by FIGS. 3 and 6 to 9 inclusive. Once the initial waves have been converted by channel 10 into potential energy waves, they are directed to a honeycomb arrangement 48 of individual vertical chambers 50, each preferably in the form of a hexagonally shaped tube in cross-section (FIG. 7) for integrity of structure and maximum utilization of space purposes. Each chamber 50 includes an open bottom 52 for receiving waves therewithin from beneath. For maximum effect, each chamber bottom 52 is coincident with theoretical wave nodal line 32, as shown in FIG. 3. The top 54 of each chamber 50 is closed, save for an intake check valve 56, and an exhaust check valve 58. Each intake valve 56 operatively communicates with an intake manifold 60 (FIGS. 3 and 6) which is supplied with ambient air through control louvres 62 and 64. Each exhaust valve 58 is connected to an exhaust manifold 66, located above intake manifold 60.

Energy extraction by air compression operates as follows. As discussed above, channel 10 converts each wave into a substantially potential energy wave, meaning that, above nodal line 32, water particle motion is nearly vertical. As each wave passes beneath honeycomb 48, it rises therewithin (see wave train line 34, FIG. 3), thereby compressing air within each chamber 50; intake valve 56 is closed at this point. As the wave continues to rise, exhaust valve 58 opens, and the compressed air is forced into exhaust manifold 66. Eventually, the wave will begin to fall within any one chamber 50, thereby causing exhaust valve 58 to close and intake valve 56 to open, so that a fresh charge of ambient air enters chamber 50 from intake manifold 60 to be compressed by a successive wave. The process is repeated throughout the length of honeycomb 48 thereby providing a constant supply of compressed air to exhaust manifold 66.

Of course, at any one moment, those chambers 50 located near or above a wave node will not be functioning at all, but the invention includes a sufficient number of chambers to compensate for the non-functioning ones so that a constant supply of compressed air is provided to exhaust manifold 66. At the same time, humidification increases, due to the creation of sub-atmospheric pressure as waves fall within some of the chambers 50. As energy is extracted from the waves, or as wave potential energy is now reconverted to kinetic energy, wave amplitude gradually decreases as the waves travel through the invention. It should be particularly noted here that at no time does sea water contact any moving parts, thus minimizing the effects of corrosion, nor will any maintenance be required in the honeycomb 48 area, since each chamber 50 is completely open at bottom 52, thus making the unit self-cleaning. In a preferred embodiment, the walls of each chamber 50 will be made of aluminum or other corrosion resistant, high tensile strength material, to mimimize corrosion yet allow for extremely thin walls so as to present the maximum number of chambers 50 possible within the area provided, and to minimize friction drop loss. It should be further noted that the energy extraction process just described occurs at or near ambient temperature, thus minimizing entropy increase loss and scale build-up, a troublesome problem in present day saline conversion systems. Entropy means the unavailable energy in a given energy system. In present day thermal power plants, energy loss is significantly higher. A more detailed analysis of thermodynamic energy loss and measurement thereof by the entropy increase concept may be found in my article entitled "A Way to Pinpoint Energy Loss," *Consulting Engineer*, January, 1962.

Louvres 62 and 64 may be located on the forward and rear walls of intake manifold 60 (FIG. 3) so as to be aligned with the wind-oriented attitude of the invention as explained above, for efficient intake of ambient air. However, it is not necessary for louvres 62, 64 to be wind-oriented; they may be located on any of the walls comprising intake manifold 60. The control louvres 62 and 64 may be used to limit the pressure created within chambers 50 if it is desirable to obtain additional fresh water by humidifying more water vapor at a reduced, rather than normal operative pressure.

The compressed air collected within exhaust manifold 66 is first de-humidified by a simple refrigerant coil process; the dehumidifier is indicated by numeral 68. This well-known process involves no more than passing the humidified air over cold coils and drawing the condensed water off by a tray or trough therebeneath (not shown). The coils of humidifier 68 may be supplied from a directly connected or separately powered refrigerant compressor in standard cycle. The resultant water may be conduited to shore for pipeline and/or tanker transportation to the point of need (not shown).

The now dehumidified compressed air is then directed to a prime mover 70, which may be either a standard axial flow or radial turbine driven power plant. In turn, prime mover 70 is shown directly connected to a generator 72, excitor 74 and refrigerant compressor 76. The spent air may be directly discharged and ventilated through plurality of ventilators 78 in the roof 80 of power unit 16 or in any suitable manner directly to the atmosphere. Necessary electrical switch gear will also be in this general location; electrical power from generator 72 would pass along a suitable cable across the convertor, down to anchor 18 and then to the shore (not shown). The invention may be entirely self-contained, without need of on-board personnel, being controlled by radio or micro-wave transmission, either directly or by use of a communications satellite with a receiving station on land (not shown). In the same manner, power transmission from the invention to a receiving station on land via microwave transmission by satellite, or to any receiving station requiring power such as an automotive vehicle, is entirely feasible. Mini-microwave transmission might be used instead, to permit a larger power load per square centimeter or unit area. If personnel are to be on board, suitable accommodations and heat (preferably radiant) can be directly supplied from the prime mover (not shown).

Figure 10:
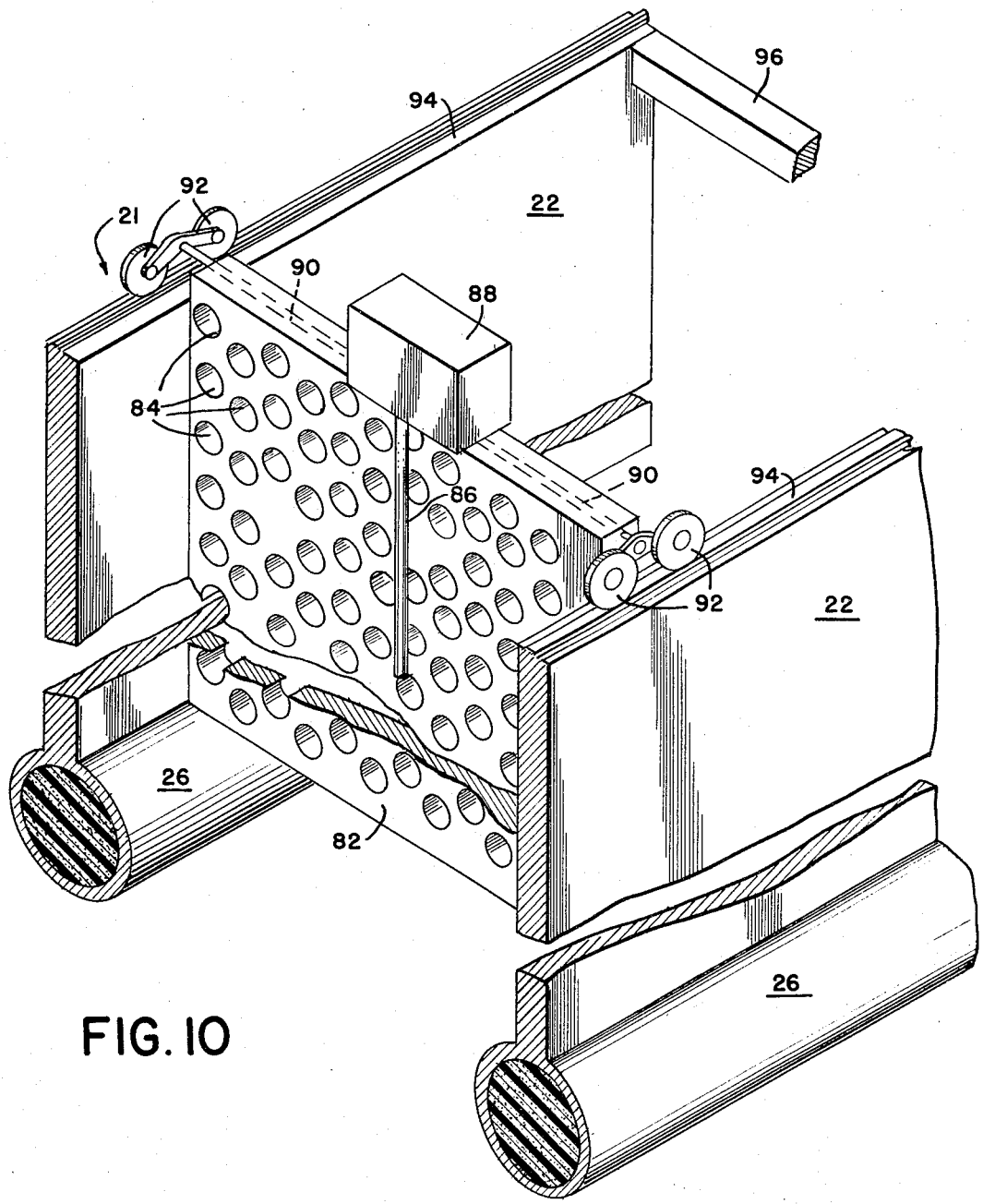
FIG. 10 is a partial perspective view showing the automatically adjustable standing wave basin for creating standing waves in the vicinity of the vertical chambers.

As mentioned previously, the purpose of channel 10 is to create standing waves having substantially only potential energy in honeycomb area 48. Assistance to this end is enhanced by provision of automatically adjustable standing wave basin 21. Basin 21 comprises vertical stabilizing walls 22, 22 and a linearly movable vertically disposed wall 82, perforated at 84 to allow water to pass by the door easily, and positioned according to probes 86, 86 (FIGS. 3 and 10) which sense the level of water passing thereby and activate wall moving means such as a computer and motor unit 88 which drives a shaft 90 and wheels 92, riding in rails 94 located on top of each wall 22, 22. A strut 96 or struts may be provided for structural integrity. Probes or level sensing devices 86, 86 are located one immediately to the rear of honeycomb 48 (FIG. 3), and the other on movable wall 82 (FIGS. 3 & 10). Each extends from nodal line 32 to a point above wavecrest line 42. The moving rear wall 82 is positioned to create ideal dimensional criteria for a standing wave regardless of the actual wave period; thus movement signals received from probes 86, 86 are combined with frictional data, positioning of wall 82 is further determined by the Merian formula, and all of the data is computed and effected by control means such as the computer section of motor unit 88. The frictional data needed may be determined by reference to *Energy Dissipation in Standing Waves in Rectangular Basins*, Barbis H. Kenlegan, National Bureau of Standards, Washington, D.C. (revised Nov. 29, 1958); use of the Merian formula to determine basin length will be found in *Physical Oceanography*, Albert Defant, Pergamon Press (1961), Vol. 2, p. 154.

Innumerable advantages of the invention, particularly at a time when accelerating environmental pollution is approaching critical proportions, are readily obvious. Current fossil fuel supplies will be completely exhausted within a few centuries and atomic energy fuels, as we know and understand them, will be available only a few centuries more. Both fuel forms will probably become totally unacceptable before supplies are exhausted due to their chemical and thermal polluting characteristics. Present internal engine combustion pollution from automobile traffic is responsible for over half the pollution in most areas of the country and a significantly larger percentage in Los Angeles County.

The present invention provides a solution to this more than significant problem by providing a source of pure water and useful electrical energy from a prime power plant having no moving parts in contact with the water, which is totally non-pollution producing, and harnesses the extant energy of wind waves, a readily accessible and virtually unlimited source of energy, in that 71 percent of the earth's surface is covered by water. Expensive landsites for power plants and the use of expensive, sophisticated high temperature metals are unnecessary with the instant invention. The fight against water pollution in our rivers and lakes can be enhanced by directly charging such water with the supply of compressed air created, to increase the oxygen content of such water to provide the necessary biological oxygen demand to sustain water life.

I claim

1. A wave motor compressor unit employing semi-artificially created waves wherein the initial potential and kinetic energy of an extant wave is converted into substantially all potential energy comprising:

a. a reception channel of decreasing width in the direction of wave travel whereby the heighth of waves entering the channel is approximately doubled at the exit end of the channel, thereby substantially eliminating kinetic energy in the wave and converting it to potential energy; and b. a wave energy extraction system, comprising:

1. a plurality of vertical chambers, each having an open, bottom end located approximately coincident with a predetermined theoretical wave nodal line, and a closed, upper end, whereby wave water will rise and fall in the chambers;

2. a generally horizontally disposed air intake manifold located above the closed, upper ends of the vertical chambers, including check valves to each of said chambers and openable to admit ambient air, whereby wave water falling in the chambers causes ambient air to be induced into the chambers while rising water in the chambers causes said check valves to close, thus pressurizing air entrapped in the chambers;

3. a generally horizontally disposed exhaust manifold, located above said chambers, including discharge check valves communicating with said chambers, whereby rising water in the chambers causes said pressurized air to be forced into the exhaust manifold, and falling water in the chambers closes said discharge check valves; and 4. means for utilizing the energy of the resultant air under pressure located in the exhaust manifold.

2. The invention as recited in claim 1 wherein said reception channel includes sidewalls, exponentially curved in the direction of wave travel.

3. The invention as recited in claim 1 wherein said plurality of vertical chambers comprises a honeycomb of hexagonally shaped tubes in cross section.

4. The invention as recited in claim 1 wherein said wave energy extraction system further comprises a standing wave basin having a pair of vertical side walls and a movable, vertically disposed wall, located rearwardly of said plurality of vertical chambers in the direction of wave travel, and movable parallel to the direction of wave travel to create standing waves within the vertical chambers, in cooperation with said reception channel.

5. The invention as recited in claim 4 wherein said movable wall includes means defining perforation therein whereby water may move therethrough as the door is positioned, said standing wave basin further including movable wall positioning means comprising:

a. a first probe, located immediately rearwardly of the plurality of vertical chambers, and a second probe on the movable wall, for measuring the period of the wave created by the reception channel;

b. power means, for moving the door linearly, parallel to the vertical side walls; and c. control means, interconnected between the probes and the power means, for positioning the door so as to create standing waves in the vertical chambers, in response to the wave period determined by the probes.

6. The invention as recited in claim 5 wherein each probe comprises a water level sensing device, extending vertically from said theoretical wave nodal line to a point above a plane drawn through said closed upper ends of the vertical chambers.

7. The invention as recited in claim 5 wherein the power means comprises:
a. a motor drive unit located on top of said movable wall;
b. a drive shaft, extending from the motor drive unit to each vertical side wall;
c. two pairs of wheels, one for each side wall, driven from the drive shaft; and
d. means defining rails along the top of each side wall, for said pairs of wheels; whereupon activation of the motor unit causes rotation of said wheels and movement of the movable wall, linearly in a direction parallel to the length of said vertical side walls.

8. The invention as recited in claim 1 wherein said intake manifold further comprises louvre means therein for controlling the flow of ambient air thereinto.

9. The invention as recited in claim 1 wherein said wave motor compressor unit further includes:
a. a positively buoyant base structure for supporting the invention in a body of water so that said predetermined theoretical wave nodal line is coincident with the bottoms of the vertical chambers;
b. anchor means associated with the reception channel to maintain the invention stable in the water with respect to the bottom of the body of water; and
c. a pair of generally vertically disposed stabilization plates located rearwardly of the vertical chambers, for maintaining the invention in line with the direction of wave travel.

10. The invention as recited in claim 1 wherein said means for utilizing the energy of the resultant air under pressure located in the discharge manifold comprises:
a. a refrigerant coil water condensing system, located above the discharge manifold, for extracting water vapor from the air under pressure; and
b. a prime mover system, powered by the air under pressure subsequent to having water extracted therefrom.

11. The invention as recited in claim 10 wherein said prime mover comprises an air actuated turbine, and further includes an electrical power generator, operatively connected to the turbine.

* * * * *